(12) United States Patent
Hird et al.

(10) Patent No.: US 11,724,551 B2
(45) Date of Patent: Aug. 15, 2023

(54) TIRES WITH SEGMENTED TIRE BODIES, EMBEDDED MOUNTING ELEMENTS AND PARTIALLY EMBEDDED CLEATS

(71) Applicant: 1434882 Alberta Ltd., Winnipeg (CA)

(72) Inventors: Derek Hird, Winnipeg (CA); Jose M. Vechina, Winnipeg (CA); Eric E. Bittner, Winnipeg (CA)

(73) Assignee: 1434882 Alberta Ltd., Winnipeg (CA)

( * ) Notice: Subject to any disclaimer, the term of this patent is extended or adjusted under 35 U.S.C. 154(b) by 719 days.

(21) Appl. No.: 15/777,111

(22) PCT Filed: Nov. 7, 2016

(86) PCT No.: PCT/CA2016/051292
§ 371 (c)(1),
(2) Date: May 17, 2018

(87) PCT Pub. No.: WO2017/083960
PCT Pub. Date: May 26, 2017

(65) Prior Publication Data
US 2018/0361799 A1    Dec. 20, 2018

Related U.S. Application Data

(60) Provisional application No. 62/277,215, filed on Jan. 11, 2016, provisional application No. 62/256,370, filed on Nov. 17, 2015.

(51) Int. Cl.
*B60C 7/08*    (2006.01)
*B60C 7/10*    (2006.01)
(Continued)

(52) U.S. Cl.
CPC ............ *B60C 11/1643* (2013.01); *B60C 7/08* (2013.01); *B60C 7/26* (2013.01); *B60C 11/0311* (2013.01);
(Continued)

(58) Field of Classification Search
CPC ....... Y10T 152/1036; Y10T 152/10279; Y10T 152/10324; Y10T 152/10333;
(Continued)

(56) References Cited

U.S. PATENT DOCUMENTS 760,237 A * 5/1904 Nilson ................ B60C 7/08
152/308
946,044 A * 1/1910 Hodgson ............... 152/308 X
(Continued)

FOREIGN PATENT DOCUMENTS

JP    2000118205 A * 4/2000
WO    WO-96/05917 A1 * 2/1996

*Primary Examiner* — Adrienne C. Johnstone
(74) *Attorney, Agent, or Firm* — Kyle R Satterthwaite; Ryan W Depius; Ade & Company Inc.

(57) ABSTRACT

Segmented tires employ segments featuring cooperating recesses and protrusions at opposing sides thereof for mating of the segments with one another in the assembled tire body. Cleated tires with embedded cleats of greater rigidity than the tire body material provide improved traction in muddy or other slippery conditions while the compressible tire body smooths out the ride harshness of the tire. Mounting elements are also embedded within the segments of the tire body for secure mounting and reliable retention of the segments.

5 Claims, 10 Drawing Sheets

(51) Int. Cl.
  *B60C 11/03* (2006.01)
  *B60C 11/16* (2006.01)
  *B60C 7/26* (2006.01)

(52) U.S. Cl.
  CPC .......... *B60C 11/1637* (2013.01); *B60C 7/107* (2021.08); *Y10T 152/1036* (2015.01)

(58) Field of Classification Search
  CPC ..... Y10T 152/10342; Y10T 152/10351; Y10T 152/10369; B60C 7/08; B60C 7/102; B60C 2007/107; B60C 7/107
  USPC ....... 152/308, 152, 300, 304–307, 309, 324, 152/303, 209.12, 316
  See application file for complete search history.

(56) References Cited

U.S. PATENT DOCUMENTS

| | | | | |
|---|---|---|---|---|
| 975,325 | A | * | 11/1910 | Budesheim et al. .... B60C 7/102 |
| | | | | 152/152 |
| 1,013,085 | A | * | 12/1911 | Whitlock .................. 152/209.13 |
| 1,131,223 | A | * | 3/1915 | Dundon .................... 152/308 X |
| 1,489,237 | A | * | 4/1924 | Pauls ........................ B60C 7/12 |
| | | | | 152/324 |
| 1,498,336 | A | * | 6/1924 | Wright ................. 152/209.13 X |
| 8,678,054 | B2 | * | 3/2014 | MacPherson ............. B60C 7/08 |
| | | | | 152/306 |

\* cited by examiner

TIRES WITH SEGMENTED TIRE BODIES, EMBEDDED MOUNTING ELEMENTS AND PARTIALLY EMBEDDED CLEATS

CROSS REFERENCE TO RELATED APPLICATIONS

This application is the national stage of PCT/CA2016/051292, filed Nov. 7, 2016, which claims benefit under 35 U.S.C. 119(e) of U.S. Provisional Patent Application No. 62/256,370, filed Nov. 17, 2015, and U.S. Provisional Patent Application No. 62/277,215, filed Jan. 11, 2016, the entireties of which are incorporated herein by reference.

FIELD OF THE INVENTION

The present invention relates generally to tires, and more particularly to segmented and cleated tires of unique construction.

BACKGROUND

In the prior art, it has been previously proposed to mount a set of circumferentially cleated steel drums externally over the conventional pneumatic tires of a skid steer machine as an alternative to equipping the machine with track suspension to provide improved traction and provide puncture prevention.

In co-pending Canadian Patent Application No. 2.924.331, Applicant discloses a tireless skid steer wheel employing cleated steel drums installed in place of, instead of over, the conventional pneumatic tires of a skid steer.

While providing the intended improvement in traction, there remains room for improved ride smoothness over these prior art designs in which solid steel cleats are mounted circumferentially around a rigidly shaped steel drum.

It is also known in the art to assemble a non-pneumatic tire body from a plurality of segments. There remains room for improvement or alternatives in the assembly of the segments to one another, and in the configuration of mounting components for securing the segments on a cooperating rim to form a completed wheel.

SUMMARY OF THE INVENTION

According to a first aspect of the invention, there is provided a cleated composite tire comprising:

a resiliently radially-compressible tire body having an outer circumference spanning circumferentially around a central rotational axis on which said tire body is rotatable; and a plurality of cleats of greater rigidity than the tire body, each cleat being partially embedded within the tire body and projecting outwardly from the outer circumference of the tire body to a terminal end of the cleat that lies radially outward from the outer circumference of the tire body, the terminal ends of the cleats being circumferentially spaced apart from one another around the outer circumference of the tire body.

Preferably the radially-compressible tire body comprises a plurality of tire segments each spanning a respective partial circumferential distance around said central rotational axis.

Preferably each tire segment has a portion of at least one of said cleats partially embedded therein.

Preferably each segment comprises a first side facing a first circumferential direction around the rotational axis of the tire body and a second side facing an opposing second direction around the rotational axis, the first side wall having a recessed area therein and the second side wall having a protruding area thereon sized and shaped for mating with the recessed area in the first side of an adjacent one of the plurality of tire segments.

Preferably the recessed area of each segment reaches an outer surface thereof so as to accommodate radial sliding of the adjacent tire segment into place during assembly of the tire body.

Preferably each recessed area and each protruding area is rectangular in shape.

Preferably each recessed area and each protruding area spans a full radial dimension of the respective segment between outer and inner surfaces that respectively define the outer circumference of the tire and an opposing inner circumference thereof.

Preferably each recessed area and each protruding area is centered in axial directions of the respective segment so that the recessed and protruding areas mate together at a midplane of the tire and block axial separation of adjacent segments from one another in both axial directions moving outward from said mid-plane.

Preferably the tire body comprises circumferentially spaced apart cavities therein at a radially intermediate region residing radially between the cleats and an inner circumference of the tire body.

Preferably there are provided mounting elements embedded within the tire body for use in coupling said tire body to a compatible rim in a position holding an inner circumference of said tire body against said compatible rim.

Preferably the mounting elements embedded within the tire body at a radially inner region residing radially between the inner circumference of the tire body and the circumferentially spaced cavities.

Preferably the mounting elements comprise mounting plates fully embedded within the tire body.

Preferably the mounting elements comprise fasteners partially embedded within the tire and reaching inwardly from the inner circumference thereof.

Preferably the mounting plates comprise holes therein through which respective fasteners extend inwardly toward and through the inner circumference of the tire body.

Preferably the holes in the mounting plates and the respective fasteners are cooperatively shaped to block rotation of the fasteners relative to the mounting plates.

Preferably each fastener is a carriage bolt, and each hole in the mounting plate is sized and shaped to receive a square shoulder of the carriage bolt and constrain said square shoulder against rotation.

Preferably the fasteners are affixed to said mounting plates.

Preferably the fasteners are welded to said mounting plates.

At least one of the mounting elements, preferably each mounting plate, is coated with a bonding agent, and said bonding agent is chemically bonded with surrounding material of the tire body.

At least one of the mounting elements, preferably each mounting plate, may comprise textured surfaces providing improved bonding with surrounding material of the tire body.

Preferably each textured surface is sandblasted.

At least one of the mounting elements, preferably each mounting plate, may have at least one opening therein at a location embedded within the tire body, and material of the tire body spans through said mounting element via said at least one opening.

Preferably the plurality of cleats includes pairs of joined together cleats, each of said pairs comprising two integrally connected cleats joined together within the tire body.

Preferably each pair of joined together cleats comprises a U-shaped cleat body having two side walls projecting outward from the outer circumference of the tire body and a central span joining the two side walls together within the tire body.

Preferably each cleat has at least one opening therein at a location embedded within the tire body, and a resiliently compressible material of the tire body spans across said cleat through said at least one opening.

Preferably the opening(s) through which the resiliently compressible material of the tire body spans across said cleat is/are located in the central span of the cleat body.

Preferably the tire body comprises first and second sides spaced apart in an axial direction of the tire body, and the cleats are arranged staggered pattern in which sequentially adjacent cleats around the outer circumference of the tire body alternate between a first position adjacent the first side of the tire body and a second position adjacent the second side of the tire body.

Preferably each cleat terminates short of both the first and second sides of the tire body.

Preferably each cleat is a metal cleat.

Preferably each cleat is a steel cleat.

Preferably the tire body is a rubber tire body.

Preferably each cleat has a length measured axially of the tire body that exceeds a thickness of the cleat measured tangentially of the tire body.

Preferably the length of each cleat equals or exceeds half of a tire width measured axially of said tire body.

Preferably a portion of each cleat projecting outward from the outer circumference of the tire body is plate-shaped.

Preferably the tire body is a non-pneumatic tire body.

According to a second aspect of the invention, there is provided a tire segment for cooperation with like tire segments to form a cleated composite tire, the tire segment comprising:

a piece of resiliently compressible material having an outer surface for facing outwardly away from a central rotational axis of the tire in an assembled state thereof; and at least one cleat of greater rigidity than the piece of resiliently compressible material, each cleat being partially embedded within the piece of resiliently compressible material and projecting outwardly from piece of resiliently compressible material to a terminal end of the cleat that lies radially outward from the piece of resiliently compressible material.

Any of the preferable features applied to the tire of the first aspect of the invention may likewise be applied to the tire segment of the second aspect of the invention.

According to a third aspect of the invention, there is provided a tire comprising:

a resiliently radially-compressible tire body having an outer circumference spanning circumferentially around a central rotational axis on which said tire body is rotatable, said tire body being assembled from a plurality of tire segments each spanning a respective partial circumferential distance around said central rotational axis;

wherein each segment comprises mounting elements embedded within the tire body for use in securing coupling said tire body to a compatible rim.

According to a fourth aspect of the invention, there is provided a tire segment for cooperation with like tire segments to form a tire body, the tire segment comprising:

a piece of resiliently compressible material having an outer surface for facing outwardly away from a central rotational axis of the tire in an assembled state thereof; and mounting elements embedded within the piece of resiliently compressible material for use in coupling said piece to a compatible rim in a position holding an inner surface of said piece against said compatible rim such that like installation of like pieces on said compatible rim forms a tire body spanning fully around said compatible rim.

Any of the options listed above concerning inclusion of mounting elements in the tire of the first aspect of the invention may likewise be applied to the tire and tire segment of the third and fourth aspects of the invention.

According to a fifth aspect of the invention, there is provided a method of manufacturing a cleated composite tire comprising inserting a pre-defined cleat into a mold cavity that is shaped according to a desired final form of a tire body or tire body segment, wherein inserting the pre-defined cleat into said mold comprises placing said pre-defined cleat into a predetermined position in which the cleat partially resides within the mold cavity such that, under mould-forming of the tire body or tire body segment around said pre-defined cleat, the cleat is only partially embedded within the finished tire body or tire body segment, and therefore and projects outwardly from said tire body or tire body segment.

Preferably the method further includes mold-forming the tire body or tire body segment around the inserted pre-defined cleat from a material of lesser rigidity and greater resilient compressibility than said pre-defined cleat.

Preferably the method includes coating the cleat with a bonding agent prior to mould forming the tire body segment around said cleat.

Preferably the method includes texturizing surfaces of the cleat prior to mould-forming the tire body segment around said cleat.

Texturizing said surfaces preferably comprises sandblasting the cleat prior to mould-forming the tire body segment around cleat.

Preferably the coating of the bonding agent onto the cleat is performed after texturizing of said surfaces.

Preferably the cleat has at least one mould-through opening therein, and the method comprises mould-forming said tire body segment around said cleat and also through said cleat via said at least one mould-through opening.

According to a sixth aspect of the invention, there is provided a method of manufacturing a composite tire comprising inserting at least one pre-defined mounting element into a mold cavity that is shaped according to a desired final form of a tire body segment, wherein inserting said at least one mounting element comprises placing said at least one mounting element into a predetermined position in which the at least one mounting element at least partially resides within the mold cavity such that, under mould-forming of the tire body segment around said at least one mounting element, the at least one mounting element is at least partially embedded within the finished tire body segment for use in coupling said tire body segment to a compatible rim.

Preferably the at least one mounting element comprises a mounting plate.

Preferably said at least one mounting plate has an elongated bar-shape, and inserting said at least one mounting plate comprises placing said elongated bar-shape in an orientation lying axially of the tire body segment.

Preferably the at least one mounting element comprises a fastener.

Preferably the method includes placing said fastener in a position placing a head of said fastener on one side of said mounting plate with a stud of said fastener passing through a respective opening in the mounting plate to another side of the mounting plate that faces an inner surface of the finished tire body segment such that the stud of said fastener reaches through said inner surface of the finished tire body segment.

Preferably the fastener and the respective opening in the mounting plate are cooperatively sized and shaped to prevent relative rotation between the fastener and the mounting plate.

Preferably the method includes affixing the fastener to the mounting plate prior to placement thereof in the mold.

Preferably the method includes welding the fastener to the mounting plate prior to placement thereof in the mold.

The method may include coating at least one mounting element, preferably including the mounting plate, with a bonding agent prior to mould-forming the tire body segment around said at least one mounting element.

The method may include texturizing surfaces of at least one mounting element, preferably including the mounting plate, prior to mould-forming the tire body segment around said at least one mounting element.

Texturizing said surfaces preferably comprises sandblasting the at least one mounting element prior to mould-forming the tire body segment around said at least one mounting element.

Preferably the coating of the bonding agent onto the at least one mounting element is performed after texturizing of said surfaces.

At least one mounting element, preferably including the mounting plate, has at least one mould-through opening therein, and the method comprises mould-forming said tire body segment around said at least one mounting element and also through said at least one mounting element via said at least one mould-through opening.

According to a seventh aspect of the invention, there is a provided a segmented tire comprising:

a resiliently radially-compressible non-pneumatic tire body having an outer circumference spanning circumferentially around a central, rotational axis on which said tire body is rotatable, said tire body comprising a plurality of tire segments each spanning a respective partial circumferential distance around said central rotational axis;

each segment comprises a first side facing a first circumferential direction around the rotational axis of the tire body and a second side facing an opposing second direction around the rotational axis, the first side having a recessed area therein and the second side having a protruding area thereon sized and shaped for mating with the recessed area in the first side of an adjacent one of the plurality of tire segments.

According to an eighth aspect of the invention, there is provided a tire segment for cooperation with like tire segments to form a tire body, the tire segment comprising:

a piece of resiliently compressible material having an outer surface for facing outwardly away from a central rotational axis of the tire in an assembled state thereof, a first side for facing a first circumferential direction around the rotational axis of the tire body and a second side for facing an opposing second direction around the rotational axis, the first side having a recessed area therein and the second side having a protruding area thereon sized and shaped for mating with the recessed area in the first side of an adjacent one of the like tire segments.

Any of the options listed above for the first aspect of the invention concerning the preferable inclusion of protruding and recessed areas in the tire segments may likewise be applied to the tire and tire segment of the seventh and eighth aspects of the invention.

BRIEF DESCRIPTION OF THE DRAWINGS

Preferred embodiments of the invention will now be described in conjunction with the accompanying drawings in which.

In the drawings like characters of reference indicate corresponding parts in the different figures.

DETAILED DESCRIPTION

Figure 1:
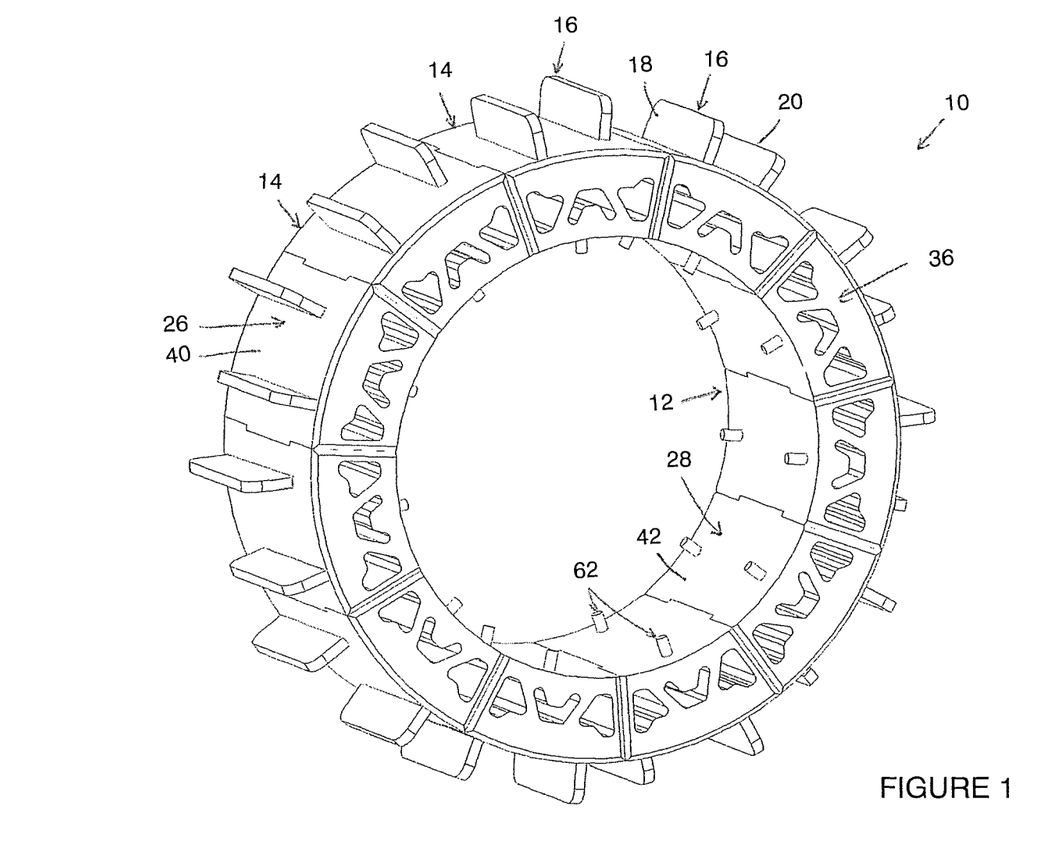
FIG. 1 is a perspective view of a composite tire according to a first embodiment of the present invention, in which U-shaped cleat bodies are partially embedded within a non-pneumatic segmented tire body to provide a circumferentially spaced array of steel cleats projecting from the outer circumference of the tire body.
Figure 2:
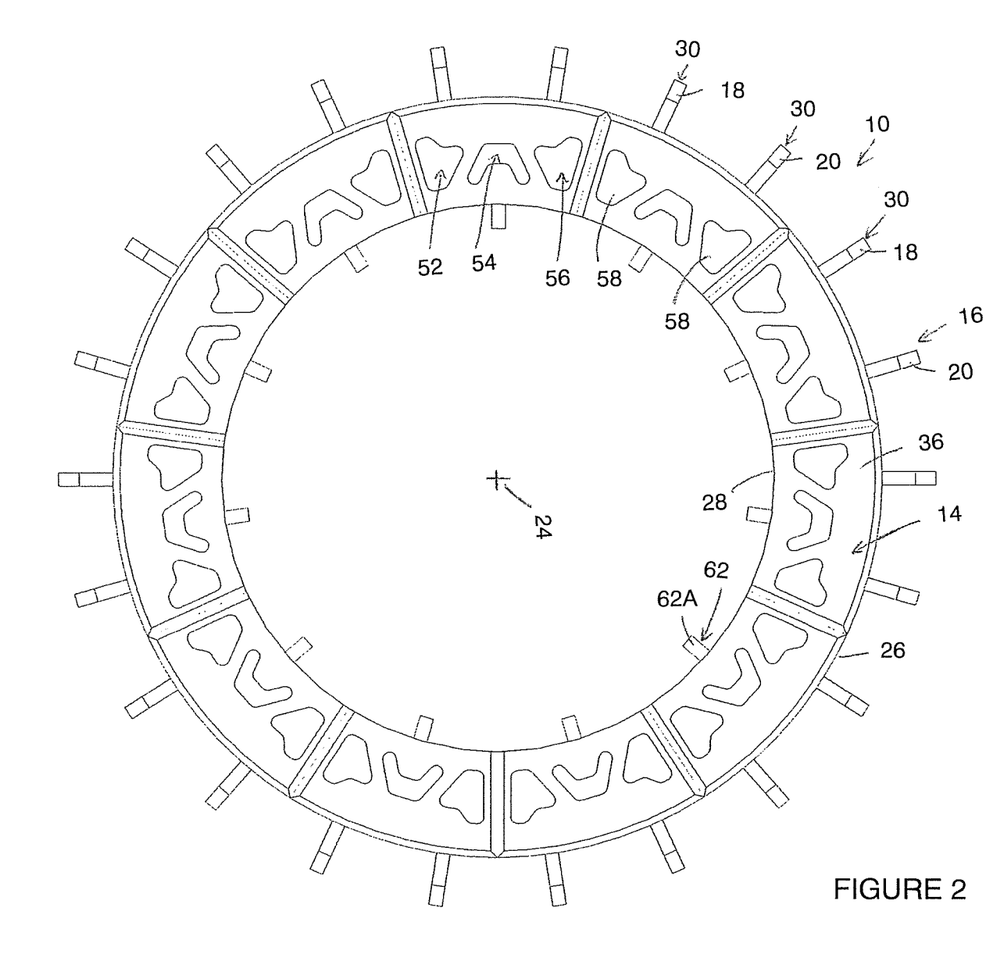
FIG. 2 is a side elevational view of the tire of FIG. 1.
Figure 3:
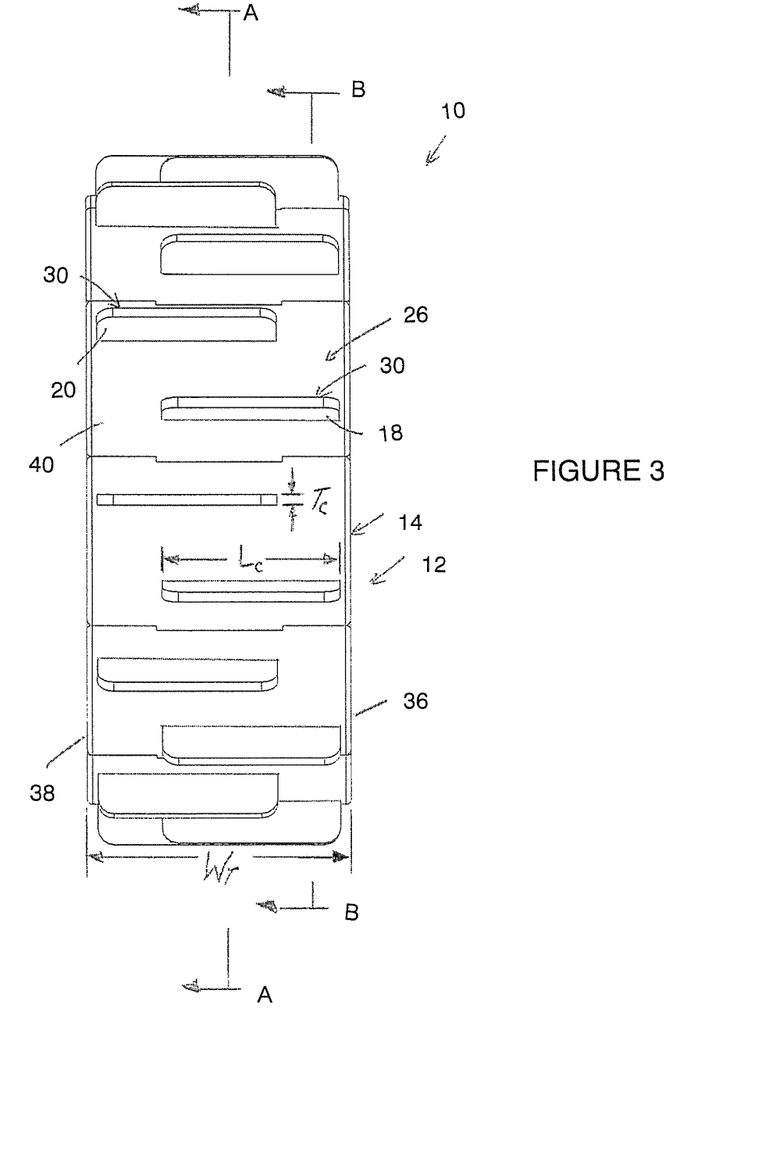
FIG. 3 is an end elevational view of the tire of FIG. 1.

FIG. 1 illustrates a composite tire 10 featuring a cylindrically annular rubber tire body 12 assembled from a plurality of identical segments fasteners, and a plurality of cleat bodies 16 each partially embedded within a respective one of the tire body segments 14. Each cleat body 16 is a channel-shaped piece of steel having two side walls 18, 20 and a central span 22 joining the two side walls together. Each side wall 18, 20 lies in a respective radial plane that contains and emanates radially outward from a central axis 24 around which the tire body concentrically closes. This central axis 24 defines the rotational axis on which the wheel rotates during use, and is therefore also referred to herein as the central rotational axis of the tire 10. Each segment 14 of the tire body is a piece of rubber or other resiliently compressible material in which the central span 22 of the respective cleat body 16 is fully embedded. The outer circumference 26 of the tire body 12 is a cylindrical surface lying concentrically of the central rotational axis 24, as is the inner circumference 28 of the tire body 12, which is of smaller diameter and thus lies radially inward of the outer circumference 26. Unlike a pneumatic tire where the inner circumference is defined by the bead-equipped inner ends of two side walls that reach radially inwardly from the crown of the tire at the outer circumference, the non-pneumatic tire body 12 has a uniform radial thickness across the full width of the tire, whereby the cylindrical band-like inner circumference of spans the full width of the tire at a uniform radial distance from the tire's central rotational axis. When mated with a rim, the non-pneumatic tire body therefore contacts the rim over a full, or substantially full, width thereof.

Figure 4:
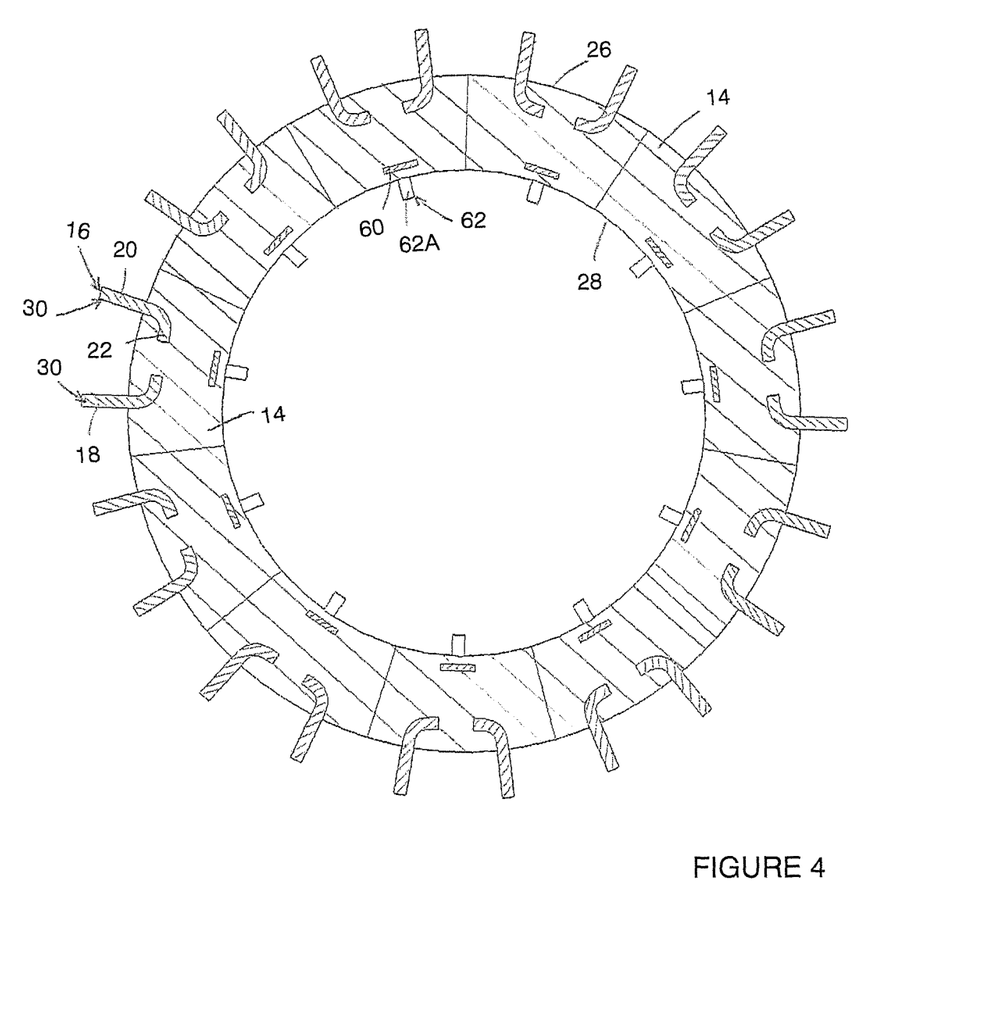
FIG. 4 is a cross-sectional view of the tire of FIG. 3 as viewed along line A-A thereof, which denotes a mid-plane of the tire.

As best shown in FIG. 4, the central span 22 of each cleat body 16 resides a short distance inwardly from the outer circumference of the tire body in a tangentially oriented plane thereof, and the two side walls 18, 20 of each cleat body 16 project outwardly through the outer circumference 26 of the tire body such that each side wall 18, 20 defines a respective cleat 30 reaching radially outward from the tire body to a terminal end 32 of the cleat 30 that will therefore contact the ground during rotation of the tire. Each cleat body 16 is moulded into the respective segment 14 of the tire body during manufacture thereof, as described in more detail below, whereby each cleat 30 is retained in place solely by the embedded state of the respective cleat body 16 within the tire body, without the use of any additional cleat fasteners or cleat retention means. The central span 22 of each cleat body 16 features a series of openings 34 therein at spaced apart intervals in the axial direction of the tire. The tire body material spans radially across the central span 22 of the cleat body 16 through these openings 34 in order to more firmly secure the cleat body in place.

The tire body 16 has two opposing sides 36, 38 spaced apart in the axial direction thereof. A length of each cleat body 16 measured axially of the tire body 12 is slightly less than a width of the tire measured in the same axial direction between the two sides 36, 38 of the tire body 16. The cleat bodies 16 are centered between the two sides of the tire body, whereby each end of the cleat body terminates a short distance axially inward from the respective side of the tire body. This way, neither end of the cleat body is exposed at the respective side of the tire body, thereby improving the cleat's resistance to delamination, loosening or separation from the tire body. The central span 22 of each cleat body spans and defines the full length of the overall cleat body while each side wall 18, 20 projecting outward form the outer circumference 26 of the tire body to define the respective cleat 30 has a shorter axial length than the central span 22. The two cleats 30 of each cleat body 16 start at opposing ends of the cleat body 16, whereby one of the two cleats resides nearer to one side of the tire body and the other cleat resides nearer to the other side of the tire body. Moving around the outer circumference 26 of the tire body, each cleat body 16 lies in an axially-reversed orientation relative to the next cleat body 16. As a result, the cleats are arranged in staggered pattern in which sequentially adjacent cleats around the outer circumference of the tire body alternate between a first position adjacent the first side of the tire body and a second position adjacent the second side of the tire body. The staggering of the cleats balances the desire for cleats of notable axial length to ensure confident contact of the cleats with the ground over which the tire is travelling regardless of irregularities or variations therein, while leaving more space between cleats at the sides of the tire to better allow mud and debris to fall free of the tire instead of becoming firmly packed between tightly spaced cleats.

The side walls 18, 20 of each cleat body are planar or plate-like in form, whereby each cleat 30 lies axially of the tire body in a respective radial plane. Each cleat 30, in a cross-sectional plane thereof cutting perpendicularly through the planar cleat in a tangential direction of the tire body therefore has a length $L_C$ or axial dimension that exceeds its thickness $T_C$ or tangential dimension. The length dimension $L_C$ of each cleat is more than half of the tire width $W_T$, and in one embodiment less than ¾ of the tire width $W_T$, for example measuring approximately ⅔ thereof. Since each cleat body is shorter than the tire width $W_T$, and each cleat is shorter than the overall cleat body length (as defined by the central span 22 thereof), the two cleats 30 of each cleat body 16 thus overlap one another in the axial direction of the tire. Each cleat 30 reaches past a vertical mid-plane, which herein refers to a reference plane that cuts through the tire halfway between the sides 36, 38 thereof and lies perpendicular to the central rotational axis 24. The angular distance between any two sequentially adjacent cleat bodies 16 in the circumferential direction around the central rotational axis 24 is equal to the circumferentially angular distance between the two cleats of each cleat body 16 so that all the cleats are equally spaced around the tire.

Each tire body segment 14 spans a respective partial circumferential distance around the central rotational axis 24 so that a convex outer surface 40 of each segment defines a respective span of the overall tire body's outer circumference 26, while a convex inner surface 42 of each segment likewise defines a respective span of the overall tire body's inner circumference. Opposing first and second sides 44, 46 of each segment face opposing directions around the central rotational axis 24 of the tire, and each lie in a respective radial plane thereof. The first side 44 of one segment thus mates in flush contact with the second side 46 of a sequentially adjacent segment around the circumference of the assembled tire body. Each cleat body 16 is circumferentially centered in the respective tire body segment 14, whereby the mated-together sides of two adjacent or neighboring segments are located centrally between the two respective cleat bodies in the circumferential direction of the tire.

Figure 6A:
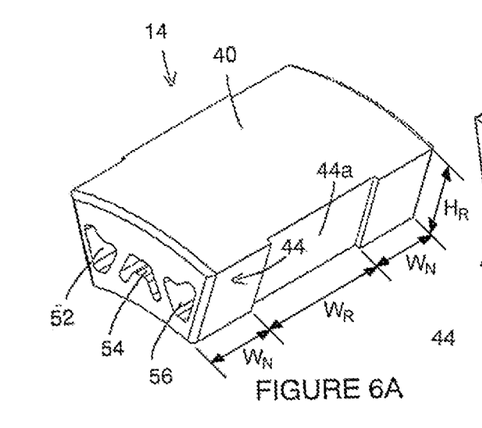
FIGS. 6A and 6B are opposing perspective views of a tire body segment of the tire of FIG. 1, with the respective cleat body omitted from the segment for illustrative purposes.
Figure 6B:
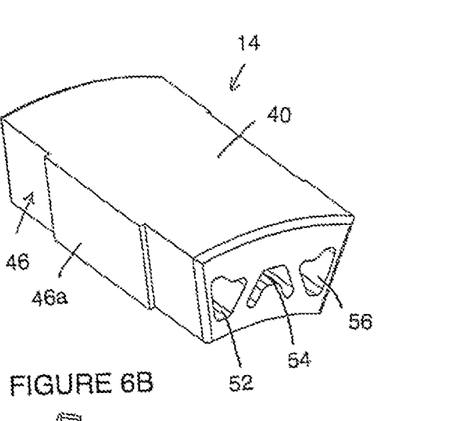

With reference to FIGS. 6A and 6B, the two mating sides 44, 46 of the neighboring segments, and thus the two opposing sides of each individual segment, have matable male and female profiles. That is, one side 44 of each segment has a female recessed area 44a therein, while the opposing side 46 has a male protruding area 46a thereon that is sized and shaped to mate with the recessed area of the adjacent segment in the assembled tire. In the illustrated embodiments, each recessed area 44a and protruding area 46a has a simple rectangular shape spanning the full radial dimension of the respective segment between the inner and outer surfaces 42, 40 thereof. Each recessed area 44a and protruding area 46a is centered in the axial direction of the respective segment 14 so that the male and female areas 44a, 46a mate together at the mid-plane of the tire and block axial separation of adjacent segments from one another in both axial directions moving outward from said mid-plane.

Each segment 14 has a plurality of hollow cavities therein, of which there are three in the illustrated embodiments. These three cavities 52, 54, 56 lie axially of the segment 14 and terminate at the opposing ends of the segment (i.e.at the opposing sides 36, 38 of the tire body 12). In the illustrated embodiments, each cavity 52, 54, 56 is open at both sides of the tire body, but is closed at the mid-plane of the tire body by an intact internal wall 58 of each tire body segment 14 that, if omitted, would result each cavity passing fully and continuously through the tire body in the axial direction, which may be true of other embodiments. Accordingly, the three cavities of each segment may be interpreted as three cavities, each of which is divided into two parallel sub-cavities situated axially end-to-end with one another and closed off from one another by the intact internal wall 58 of the segment, or may be interpreted as six total cavities, three on each side of the tire's mid-plane in alignment with the three cavities on the other side of the tire's mid-plane. The cavities, being void of the rubber material of the tire body segments, increase the radial compressibility of the segments compared to a solid rubber segment that lacks any such voids between the inner and outer circumference of the tire. While the illustrated embodiments feature material-void cavities that contain only air and lack any filler material therein, it will be appreciated that cavities containing a filler material of greater radial compressibility than the rubber of the tire segment 14 would still nonetheless increase the overall compressibility of the segment relative to a solid segment of uniform rubber composition. Accordingly, the term cavity is not intended to specifically, the absence of any material, but rather to denote the absence of the particular material surrounding the cavity, and absence of any material of lesser radial compressibility than said surrounding material. The cross-sectional shape of the cavities in planes normal to the central rotational axis of the tire may vary from those illustrated in the drawings.

The cavities of each tire body segment reside at a radially intermediate region of the segment that is spaced inwardly from each of the inner and outer surfaces 28, 26 thereof and that, more specifically, is situated radially between the respective cleat body 16 and the inner surface 40 of the segment. Accordingly, the cleat bodies 16 reside in a radially outer region of the tire body that is situated between the cavities 52, 54, 56 and the outer circumference 26 of the tire body. Accordingly, as each cleat 30 comes into contact with the ground during rotation of the tire, the vehicle weight exerted downwardly on the cleat will tend to collapse the cavities 52, 54, 56 of the respective tire body segment and compress the respective tire body segment inwardly toward the inner surface 40 thereof. The central span 22 of each cleat body 16 not only contributes to retention of the two respective cleats 30 to the respective tire body segment, but also distributes the vehicle weight over a greater width of the respective tire body segment 14 as measured between the two sides 44, 46 of the segment 14 in the circumferential direction of the tire.

Figure 5:
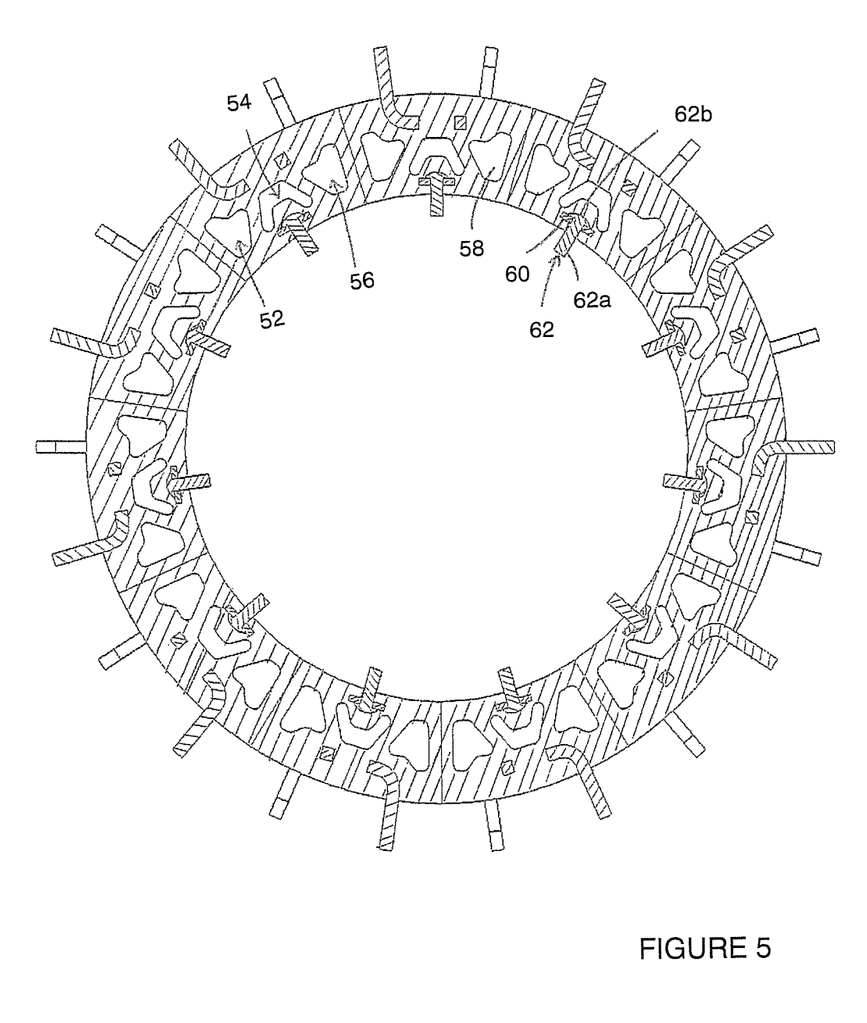
FIG. 5 is a cross-sectional view of the tire of FIG. 4 as viewed along line B-B thereof.
Figures 7, 8:
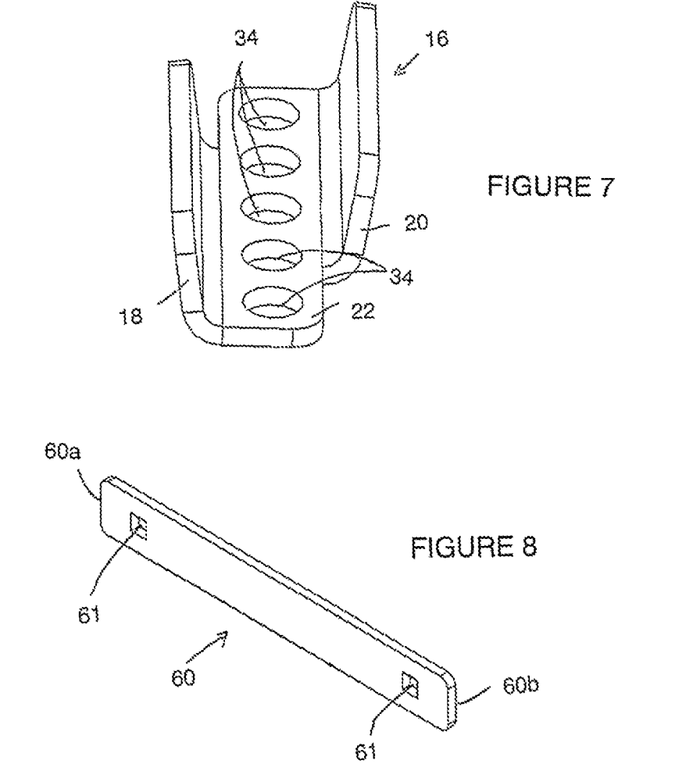
FIG. 7 is a perspective view of one of the cleat bodies of the tire of FIG. 1.
FIG. 8 is a perspective view of a mounting plate from one of the tire body segments of FIG. 1.

In addition to the embedded state of the cleat bodies 16, the tire body 12 also has mounting elements embedded within the tire body 12 for use in securing the tire body 12 to a rim that has a cylindrical outer drum over which the inner circumference 28 of the tire body 12 is to be fitted by individual fastening of the tire body segments 14 to the rim. With reference to FIGS. 4, 5 and 8, a respective mounting plate 60 of elongated rectangular bar-shape lies axially of each segment 14 in a radially inner region thereof that is situated between the cavity-containing intermediate region and the inner surface 40 of the segment 14. A pair of fastening holes or openings 61 are provided in each mounting plate 60 at respective locations near the axially opposing ends 60a, 60b of the mounting plate 60. The threaded studs or shafts 62a of a respective pair of threaded fasteners 62 extend in a radial direction toward and through the inner surface 40 of the tire body segment 14. An enlarged head 62b of each fastener 62 on the outer side of the mounting plate 60 that faces radially outwardly toward the outer circumference 26 of the tire prevents the threaded stud 62a from being drawn fully through the respective mounting plate 60.

Each fastening hole 61 of the mounting plate 60 is squarein shape, and each threaded fastener 62 is a carriage bolt with a square shoulder underlying the head 62b of the fastener 62. Each square hole 61 in the mounting plate 60 is sized to accommodate the square shoulder of the carriage bolt fastener 62 and constrain the carriage bolt fastener 62 against rotation. Accordingly, rotation of the fastener 62 is not only resisted by the rubber of the tire body segment 14 that envelopes the embedded fastener head 62b and embedded portion of the fastener stud 62a, but also is blocked by the cooperative action between the straight sided mounting plate hole 61 and the mating shape of the fastener's flat-sided shoulder. Each mounting plate 60 resides centrally between the male and female profiled sides 44, 46 of the respective tire body segment 14 in the circumferential direction of the tire body.

The rim features an array of holes passing radially through the outer drum of the rim. These holes in the rim are arranged in pairs so that each pair matches up with the respective two fasteners 62 of one of the mounting plates 60. That is, the two holes of each pair of holes in the rim are axially spaced apart from one another, and circumferentially spaced apart from the next pair, by a distance equal to the center-to-center distance between adjacent tire body segments 14 in the circumferential direction of the tire body 12.

To assemble the illustrated tire, a user places each segment 14 individually onto the outer drum of the rim in order to seat the inner surface 42 of the segment 14 on the convex outer surface of the rim's cylindrical drum, and thereby insert the two fastener studs 62b of that segment 14 through a respective pair of the holes in the outer drum of the rim. At this point, locknuts (not shown) are threaded onto the free ends of the fastener studs 62b and tightened up against the interior of the rim's outer drum, thereby securing the tire body segment 14, and the respective cleat body 16 partially embedded therein, in place on the rim. This process is repeated until all the tire body segments 14 are secured in place, thereby collectively forming the overall tire body 12 that now fully spans around the rim to define a completed wheel that is ready for mounting to the wheel hub of a vehicle. With the female recessed area of each segment spanning the full radial dimension of the segment's side up to the outer surface 40 thereof, the male and female profiles of the segment sides form slidably matable tongues and grooves that allow radial sliding of each segment into place beside the previously installed segment.

Each mounting plate 60 is fully embedded within the radially inner region thereof so as to be surrounded by the tire material on all sides. Accordingly, the entirety of the mounting plate 60 is spaced radially outward from the inner surface of the tire body segment 14 over the full axial length of the mounting plate, thereby maximizing the area over which the inner surface of the tire body segment is clamped to the rim.

Assembled wheels of the type described above are installed on a working machine such as a skid steer, skidder, wheeled excavator, or other piece of wheeled working equipment that may be expected to work in muddy or other rough terrain (fields, forests, etc.), where the steel cleats will provide beneficial for traction compared to conventional rubber tires. At the same time, the embedding of the steel cleats in a rubber or other compressible tire body provides an improved ride quality over hard ground surfaces. The resiliently radially-compressible non-pneumatic tire body provides a degree of cushioning or suspension behind each individually cleat, whereby during rolling motion of the composite tire, the vehicle weight exerted downward on a ground-contacting cleat as it moves through its lowermost revolutionary path around the tire axis will compress the underlying area of the non-pneumatic tire body that resides between that cleat and the tire's rotational axis, thereby displacing this cleat upwardly toward the tire's rotational axis such that adjacent cleats on either side of this cleat come into contact with, or closer proximity to, the ground surface. In some embodiments, the compressibility of the tire body relative to the vehicle weight is selected such that, in rotation of the tire over a flat horizontal surface, three cleats will tend to contact the ground at a time, i.e. the centermost cleat most closely underlying the wheel's rotational axis and the two cleats adjacent to this centermost cleat. This not only improves ride quality, but reduces damage to the hard ground surface by distributing the vehicle weight over multiple cleats per wheel, instead of a single cleat per wheel. Sinking of the vehicle on soft terrain is also reduced due to this improved weight distribution.

Figure 9:
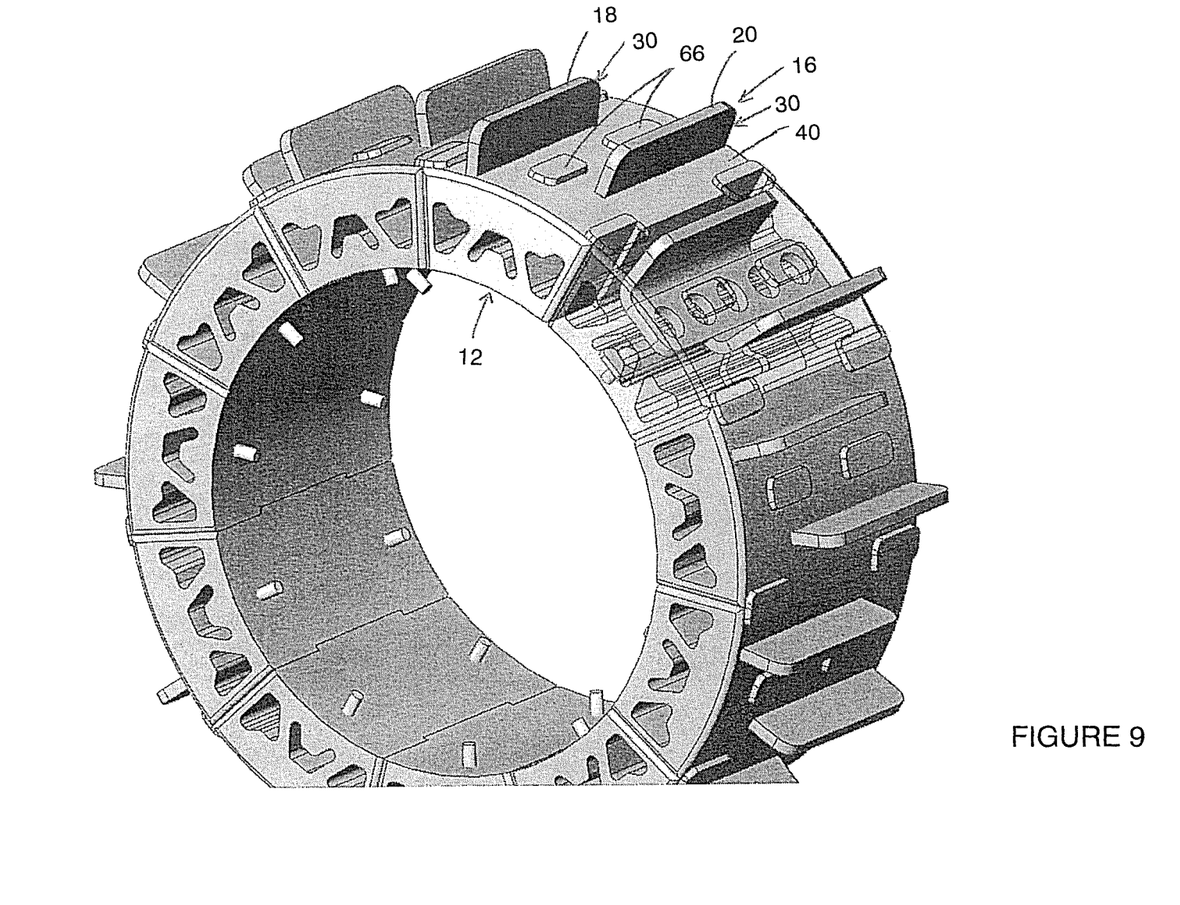
FIG. 9 is a perspective view of a variant of the composite tire showing the optional inclusion of raised tread areas on the outer circumference of the tire body.

FIG. 9 shows a variant of the forgoing wheel in which each tire body segment 14 features small protuberances 66 at select areas of the outer surface thereof, particularly at areas thereof unoccupied by the cleats 30, for example at open areas residing circumferentially between adjacent cleats at the outer circumference of the tire body. The protuberances provide the tire body with a tread pattern for improved traction on irregular terrain that may project into the open outer areas of the tire body between the cleats. With the protuberances 66 denoting raised areas of the tire body's outer circumference 26 where the tire body has greater radial thickness than the thinner remainder of the tire body at unraised areas of the outer circumference 26, it will be appreciated that the cleats 30 are embedded in the radially thinner portions of the tire body. Likewise, even in the treadless tire body of the earlier figures, the cleated areas of the tire body are not of greater or increased thickness relative to the uncleated areas between the cleats.

Figure 10:
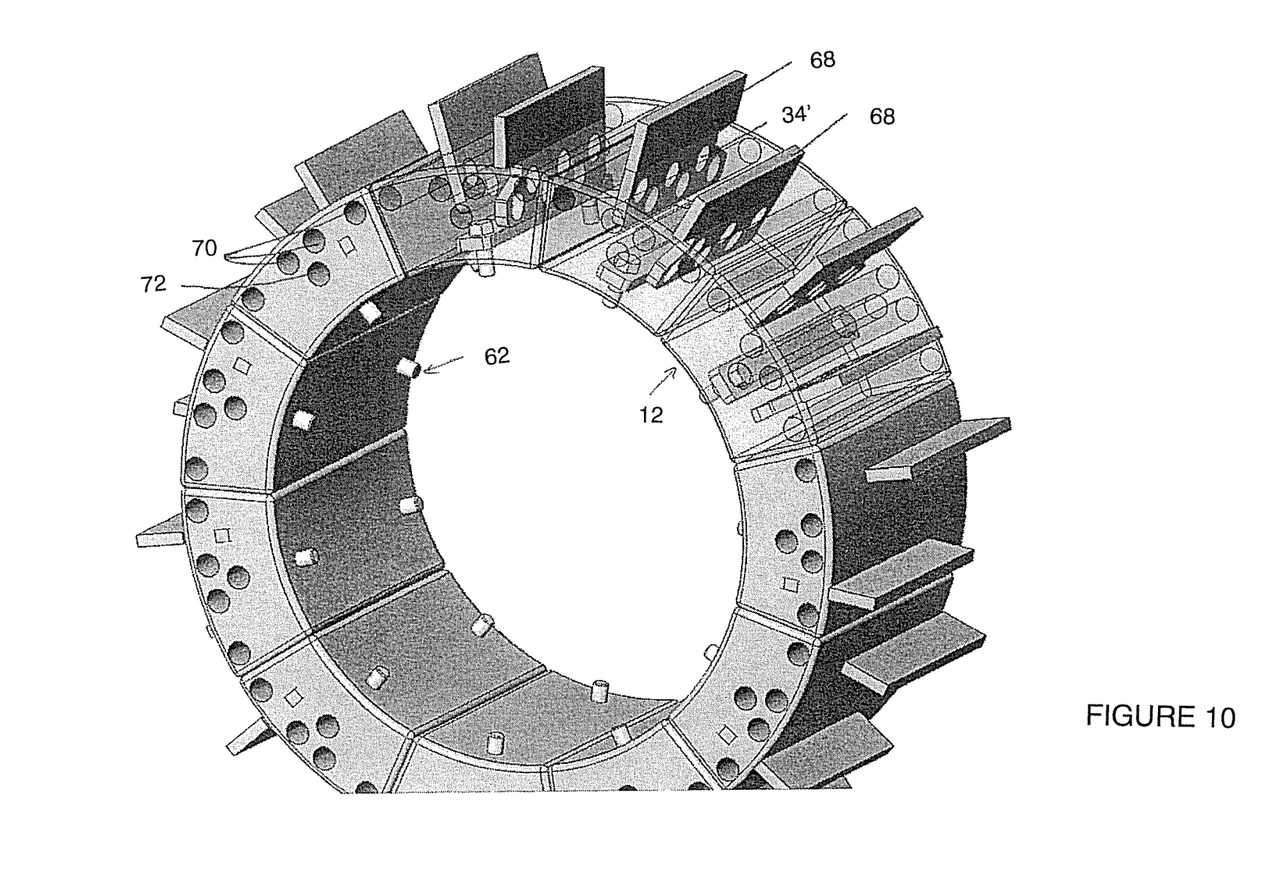
FIG. 10 is a perspective view of another variant of the composite tire in which the U-shaped dual-cleat bodies of FIG. 1 are replaced with individual cleat units.

FIG. 10 illustrates another variant in which instead of each tire body segment 14 having a single U-shaped cleat body 16 integrally defining two cleats 30, each tire body segment features two separate cleat units 68 each having a flat plate-shape defining a respective individual cleat 30 on either side of the segment's circumferential center. Instead of openings spanning radially through a central embedded span that integrally joins together two cleats of a U-shaped cleat body, each individual cleat unit 68 features openings 34' spanning therethrough in the circumferential direction of the tire body so that rubber tire body material spanning through the cleat helps retain the cleat in place on the respective tire body segment 14. The variant of FIG. 10 features outer cavities 70 located nearer to the outer surface 40 of each segment in the radially outer region thereof, as this region need not be reserved to accommodate the tangentially oriented center span 22 of the U-shaped cleat bodies 16 in the other figures. Instead, each cleat unit 68 penetrates into the tire body at a location between a respective pair of the outer cavities 70 in the radially outer region of the segment. As shown, another set of cavities 72 may be provided further inward from the outer set of cavities 70, for example at the radially intermediate region of the segment, which leave room at the radially inner region of the segment for the mounting elements 60, 62.

Whether defined by individual cleat units 68 or multiple-cleat bodies 16, the cleats 30 are partially embedded into the tire segments 14 during manufacture. This may be accomplished using insert molding techniques, where the rubber material of the tire segment 14, in a melted or viscous state, is injected into a mold cavity in which the cleats have previously been placed in predetermined positions that will partially embed the cleat units 68 or cleat body 16 within the solidified rubber once hardened in place around the cleat units or cleat body, while leaving the non-embedded remainder of the cleat units or cleat body outside the mold cavity so as to reach outward from the solidified tire body and define the cleats. During the injection molding process, the cleats may be held in place in the mold using locating pins or magnetic retention. It will be appreciated that the number of cleats per segment may be reduced to one cleat per segment (or even to embodiments in which not all segments have a respective cleat). Alternatively, the number of cleats may be increased to more than two cleats per segment. While the illustrated embodiments feature eleven segments, the number and size of the segments may likewise be varied.

Likewise, the mounting plates 60 and fasteners 62 are embedded into the tire segments during manufacture, for example by insert molding, in a manner leaving the threaded stud or shaft of the fastener outside the mold cavity so as to reach externally of the tire segment at the inner surface thereof. To optimize the bond of the mounting plates 60 within the rubber material of the finished tire segments, the mounting plates are first texturized by sandblasting and then coated with a bonding agent prior to placement of the mounting plates and threaded fasteners in the mold cavity. The bonding agent chemically bonds with the surrounding rubber during the moulding process, and the textured surfaces of the sandblasted mounting plates improve the bond at the metal/bonding-agent interface to maximize the strength of the overall bond between the plate and the rubber. In addition to the anti-rotation securement of the carriage bolt fasteners 62 by the matingly-shaped fastener holes in the mounting plates, each bolt fastener may also be permanently affixed to the respective mounting plate by tack welding. This also eases placement of the mounting plates and fasteners in the appropriate positions in the mold cavity by tack-welding each mounting plate and its respective fasteners into a pre-assembled unit before placement in the mold cavity.

Like the mounting plates, the cleats are also roughened by sandblasting or other suitable surface texturing technique, and coated with a bonding agent prior to moulding in order to best anchor the cleats in place within the hardened rubber of the finished segments.

While the cleated first embodiment features a segmented annular tire body with a central opening passing axially therethrough to accommodate a rim onto which the tire body is radially coupled by the above-described mounting elements 60, 62, cleats could likewise be embedded within a unitary molded tire body. In such embodiments, the unitary tire body may be of annular form having a central rim-accommodating opening therein, or may be of a non-annular form with an intact center in which axial bolt holes are provided for direct axial fastening of the tire to a wheel hub, thereby defining a rimless wheel. While the cleated first embodiment features a non-pneumatic tire body, other embodiments may feature embedding of cleats on an inflated pneumatic tire, though non-pneumatic configurations are considered preferable for rough terrain applications where the puncture-proof aspect of non-pneumatic designs provides improved durability with reduced service and repair needs.

Figure 11A:
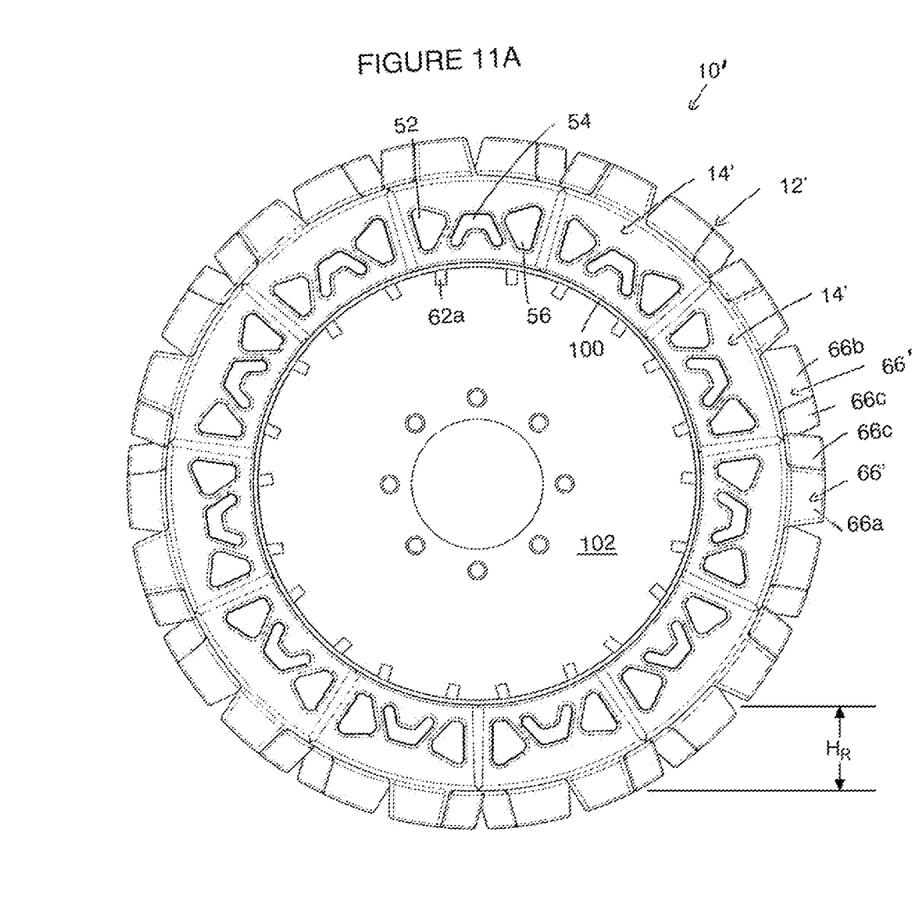
FIGS. 11A and 11B are side and end elevational views of a non-cleated composite tire according to a second embodiment of the present invention.
Figure 11B:
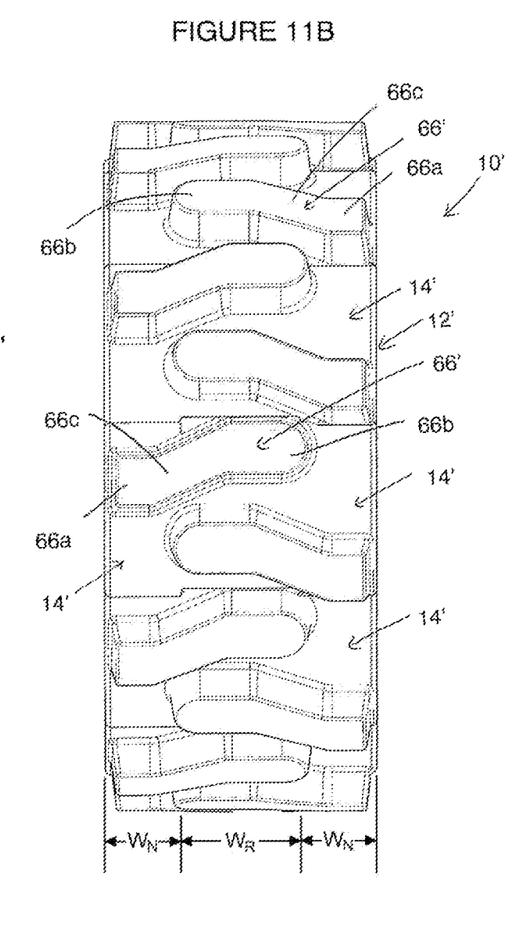
Figure 12A:
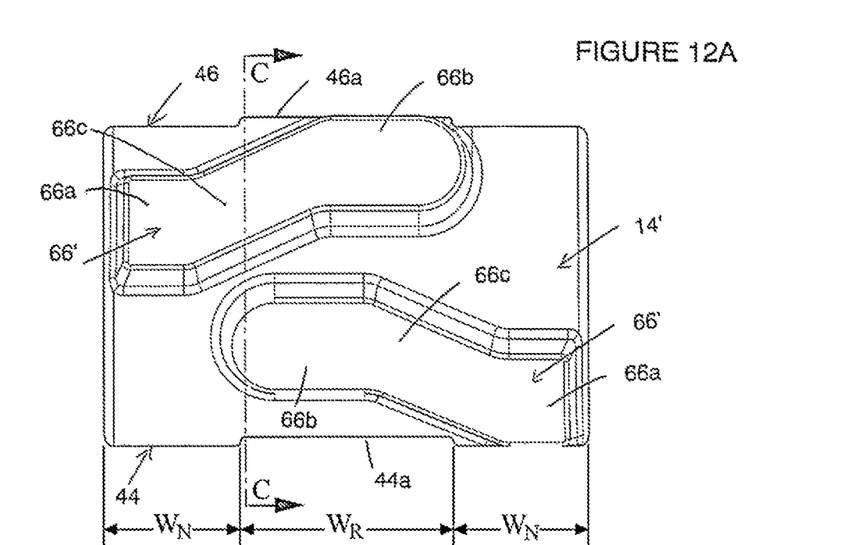
FIG. 12A is plan view of one segment of the composite tire of FIG. 11B.
Figure 12B:
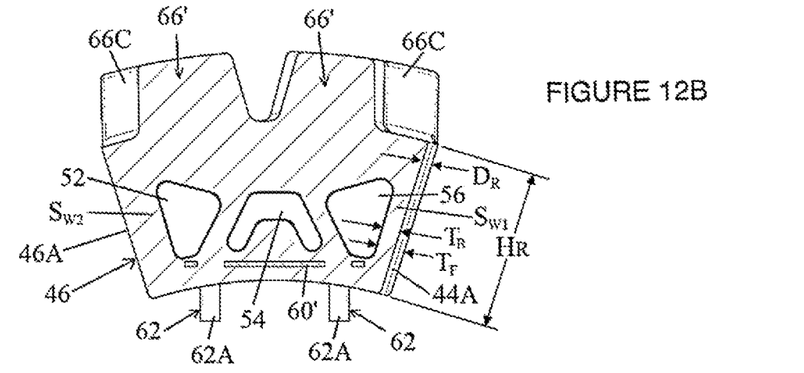
FIG. 12B is a cross-sectional view of the tire segment of FIG. 12A as viewed alone line C-C thereof.
Figure 13:
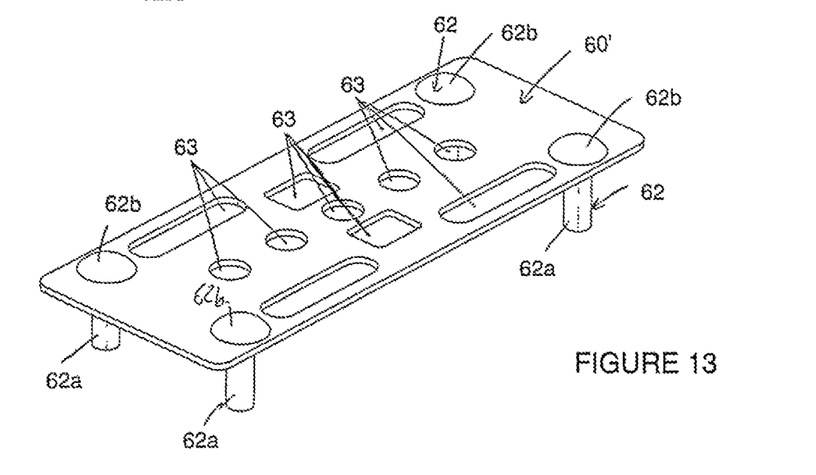
FIG. 13 is a perspective view of a pre-assembled mounting unit from the tire segment of FIG. 12B, which features a rectangular mounting plate with a set of carriage bolt fasteners welded thereto.

FIGS. 11 through 13 illustrate a second embodiment of a composite, segmented, non-pneumatic tire 10' whose tire body 12' features embedded mounting elements similar to the first embodiment, but which lacks embedded cleats and instead features integrally-moulded raised rubber ribs 66' at spaced positions around the outer circumference of the tire body to form an outer tread of the tire. In the illustrated embodiment, each rib is elongated in the axial direction of the tire, and each segment features two such ribs. The ribs are laid out in the same staggered pattern as the cleats of the first embodiment, whereby the two ribs of each segment originate at opposing sides of the tire body, and each rib crosses the mid-plane of the tire body and terminates short of the opposing side of the tire body. In its direction of elongation, each rib first extends axially from the side of the tire body at which the rib originates, then deviates from the axial direction by a small acute angle, before returning to an axial orientation at its terminating end. Each rib thus has axially oriented originating and terminating portions 66a, 66b, and an angled middle portion 66c by which the terminating portion 66b is offset from the originating portion 66a in a predetermined direction around the circumference of the tire body.

FIG. 13 illustrates the mounting plate 60' and carriage bolt fasteners 62 that are moulded in place within each tire segment, as can be seen in the cross-sectioned tire segment 14' of FIG. 12B. The mounting plate 60' is larger than that of the first embodiment, specifically having a greater width to its rectangular shape so as to span a substantial majority of the tire segment width between the opposing sides 44, 46 thereof to better anchor the segment in place on the wheel rim in the finished tire assembly. The larger mounting plate has four fasteners 62 passing through it at respective fastening holes near the four corners of its rectangular shape. Once again, the fastening holes are square in order to cooperate with the squared shoulder of the carriage bolt fasteners to prevent rotation thereof relative to the mounting plate 60'. The mounting plates and cooperating fasteners perform the same function as in the first embodiment, and the mounting plates likewise have the fasteners pre-welded thereto and are sandblasted and pre-coated with a bonding agent before being molded into their embedded positions anchored within the hardened rubber of the finished tire segments.

In addition to the surrounded state of the fully embedded mounting plate by the surrounding rubber of the tire segment, further mechanical anchoring of each mounting plate in place within the respective segment is achieved by inclusion of mould-through openings 63 in the mounting plate that serve the same function as the mould-through openings 34/34' in the cleats. During the moulding process, the flowable rubber thus not only surrounds each mounting plate on all sides thereof, but also passes through each mounting plate via the mould-through openings 63 therein. Once the rubber is hardened, this further anchors the mounting plate 60' and affixed fasteners 62 in place within the tire segment. This mechanical anchoring is further reinforced by the chemically-formed bond between the hardened rubber and the coated mounting plate. In the illustrated embodiment, multiple mould-through openings 63 of various shapes are defined in the plate at various locations spread across and along the plate, but it will be appreciated that the quantity, location(s) and shape(s) of the mould-through opening(s) may vary.

FIG. 11A shows the tire during assembly, where the segments are placed onto the drum 100 of a wheel rim 102 so that the studs 62a of the fasteners 62 project inwardly through the drum 100 via pre-defined bolt holes therein so that respective nuts can be tightened onto the fastener studs to secure the segments to the wheel rim. Like the first embodiment, the segments feature mating recessed and protruding areas 44a, 46a at opposing sides thereof for interlocking mating of the segments with one another during tire assembly.

Further description is made herein of a number of distinctive traits of the tire segments that are clearly illustrated in the appended figures. Referring to FIGS. 6A and 12A, where the recessed area 44A at the first side of the tire segment is respectively neighbored on its two sides by two non-recessed areas, it can be seen that a width dimension $W_R$ of the recessed area, measured in the axial direction of the tire, exceeds a respective width dimension $W_N$ of each of the non-recessed areas, measured in the same axial direction. As shown in FIGS. 11B and 12A, the raised treads 66' of each segment are discretely spaced from one another in the circumferential direction of the tire over an entire axial span of the raised treads 66' in the axial direction of the tire. Accordingly, the raised treads are unconnected at elevations of radially raised relation to the unraised areas between the raised treads. As can be seen in FIGS. 11A and 11B, the axial width $W_R$ of the recessed area of each segment exceeds the radial height $H_R$ of the recessed area ($W_R > H_R$). Referring to the right side of FIG. 12B, a first side wall $S_{W1}$ of the tire segment neighbors the cavity 56 at the first side of the tire segment, and is therefore characterized by the presence of recessed area 44A in the outer face of this side wall. Referring to the left side of FIG. 12B, a second side wall $S_{W2}$ of the tire segment neighbors the cavity 52 at the second side of the tire segment, and is characterized by the presence of protruding area 46A on the outer face of this side wall. The first side wall $S_{W1}$ has a Reduced Wall Thickness $T_R$ at the Recessed Area 44A Compared to a greater full wall thickness $T_F$ possessed by the first side wall at the neighboring non-recessed areas. The difference between the full wall thickness $T_F$ and the reduced wall thickness $T_R$ thus denotes a recess depth $D_R$ of the recessed area 44A ($D_R = T_F - T_R$). It can also be seen that this recess depth is less than the reduced wall thickness ($D_R < T_R$).

Since various modifications can be made in my invention as herein above described, and many apparently widely different embodiments of same made within the scope of the claims without departure from such scope, it is intended that all matter contained in the accompanying specification shall be interpreted as illustrative only and not in a limiting sense.

The invention claimed is:

1. A segmented tire comprising:
   a resiliently radially-compressible non-pneumatic tire body having an outer circumference spanning circumferentially around a central rotational axis on which said tire body is rotatable, said tire body comprising a plurality of tire segments, each being a piece of resiliently radially-compressible material spanning a respective partial circumferential distance around said central rotational axis, which denotes an axial direction of the tire;
   wherein:
   each segment comprises a first side facing a first circumferential direction around the rotational axis of the tire body and a second side facing an opposing second direction around the rotational axis, the first side having a recessed area therein and the second side having a protruding area thereon sized and shaped for mating with the recessed area in the first side of an adjacent one of the plurality of tire segments, and of which said first and second sides, including the recessed and protruding areas thereof, are all features of said piece of resiliently radially-compressible material;

the recessed and protruding areas of adjacent segments are centered in the axial direction of the tire and thus mate together at a mid-plane of the tire and block axial separation of said adjacent segments from one another in the axial direction moving outward from said midplane;

the recessed area of each segment reaches an outer surface thereof so as to accommodate radial sliding of the adjacent tire segment into place during assembly of the tire body;

at the first side of each segment, there are two non-recessed areas that each neighbor a respective side of the recessed area in the axial direction, and a width dimension of said recessed area measured in the axial direction exceeds a respective width dimension of each of said non-recessed areas measured in said axial direction;

each segment comprises hollow cavities therein, each of which, in cross-sectional planes of the tire body lying normal to the central rotational axis, is fully surrounded on all sides by said piece of resiliently radially-compressible material, said hollow cavities including a first hollow cavity (56) residing adjacent the first side (44) of the segment and a second hollow cavity (52) that is separate from the first hollow cavity (56) and resides adjacent the second side (46) of the segment;

the first cavity is bordered at the first side of the segment by a first side wall of said piece of resiliently radially-compressible material into which the recessed area is externally recessed, and the second cavity is bordered at the second side of the segment by a second side wall of said piece of resiliently radially-compressible material from which the protruding area externally protrudes; and the first side wall is characterized by a reduced wall thickness at the recessed area relative to a full wall thickness of the first side wall at the neighboring non-recessed areas thereof, and a measured difference between said full wall thickness and said reduced wall thickness denotes a depth of the recess, and is less than said reduced wall thickness.

2. The segmented tire of claim 1 wherein each segment, at the outer surface thereof, comprises a plurality of raised treads (66'), at which a radial thickness of the segment is greater than at unraised areas of the outer surface between said raised treads, and wherein one of said treads of each segment occupies the protruding area at the second side of the segment, and said raised treads of each segment are discretely spaced from one another in the circumferential direction of the tire body throughout an entire axial span of said raised treads in the axial direction, and are thus entirely unconnected to one another at elevations of radially raised relation to said unraised areas between the raised treads.

3. The segmented tire of claim 1 wherein each of said first and second hollow cavities is divided into two parallel sub-cavities, situated axially end-to-end with one another, by an internal wall (58) of the segment that lies at the midplane of the tire.

4. The segmented tire of claim 1 wherein the hollow cavities of each segment further include a third hollow cavity disposed between the first and second hollow cavities.

5. A skid steer vehicle having installed thereon a set of wheels each equipped with a respective segmented tire according to claim 1.

* * * * *